(12) United States Patent
Studer

(10) Patent No.: US 12,365,038 B2
(45) Date of Patent: Jul. 22, 2025

(54) PRESSURE-MEDIUM-CONTROLLED COUNTERSINKING TOOL WITH BLADE CENTERING

(71) Applicant: Heule Werkzeug AG, Balgach (CH)

(72) Inventor: Harry Studer, Balgach (CH)

(73) Assignee: Heule Werkzeug AG, Balgach (CH)

( * ) Notice: Subject to any disclaimer, the term of this patent is extended or adjusted under 35 U.S.C. 154(b) by 82 days.

(21) Appl. No.: 17/553,336

(22) Filed: Dec. 16, 2021

(65) Prior Publication Data

US 2022/0193794 A1 Jun. 23, 2022

(30) Foreign Application Priority Data

Dec. 18, 2020 (EP) ..................................... 20215337

(51) Int. Cl.
B23B 51/10 (2006.01)

(52) U.S. Cl.
CPC .......... B23B 51/102 (2013.01); B23B 51/101 (2013.01); *B23B 2270/025* (2013.01); *B23B 2270/24* (2013.01)

(58) Field of Classification Search
CPC ................ B23B 51/101; B23B 51/102; B23B 2270/025; B23B 2270/24

See application file for complete search history.

(56) References Cited

U.S. PATENT DOCUMENTS

| | | | |
|---|---|---|---|
| 3,572,182 A | 3/1971 | MacDonald | |
| 5,181,810 A * | 1/1993 | Heule | B23B 51/102 |
| | | | 408/154 |
| 5,507,606 A * | 4/1996 | Steiner | B23B 51/102 |
| | | | 408/93 |
| 5,927,911 A * | 7/1999 | Steiner | B23Q 11/1023 |
| | | | 408/187 |
| 6,270,296 B1 * | 8/2001 | Steiner | B23B 51/102 |
| | | | 408/180 |
| 8,540,464 B2 | 9/2013 | Heule | |

(Continued)

FOREIGN PATENT DOCUMENTS

| CN | 101670445 A | 3/2010 |
|---|---|---|
| CN | 101837474 A | 9/2010 |

(Continued)

OTHER PUBLICATIONS

EP 20215337.5 International Search Report dated May 31, 2021.
(Continued)

*Primary Examiner* — Eric A. Gates
(74) *Attorney, Agent, or Firm* — Wood Herron & Evans LLP

(57) ABSTRACT

Pressure-medium-controlled countersinking tool with one or more machining blades which are arranged in a rotatably driven base body and which can be actuated in their pivot position by supplying a pressure medium, wherein the actuation of the at least one blade takes place via at least one piston-cylinder unit actuated by the pressure medium, wherein the at least one blade is pivotably mounted on a bearing bolt forming a pivot axis and can be extended from a blade chamber arranged in the blade housing, wherein a centering device is arranged between the blade and the blade window of the base body in the radial distance from the pivot axis and in the pivot range of the at least one blade.

17 Claims, 6 Drawing Sheets

(56) References Cited

U.S. PATENT DOCUMENTS

Figure 1:
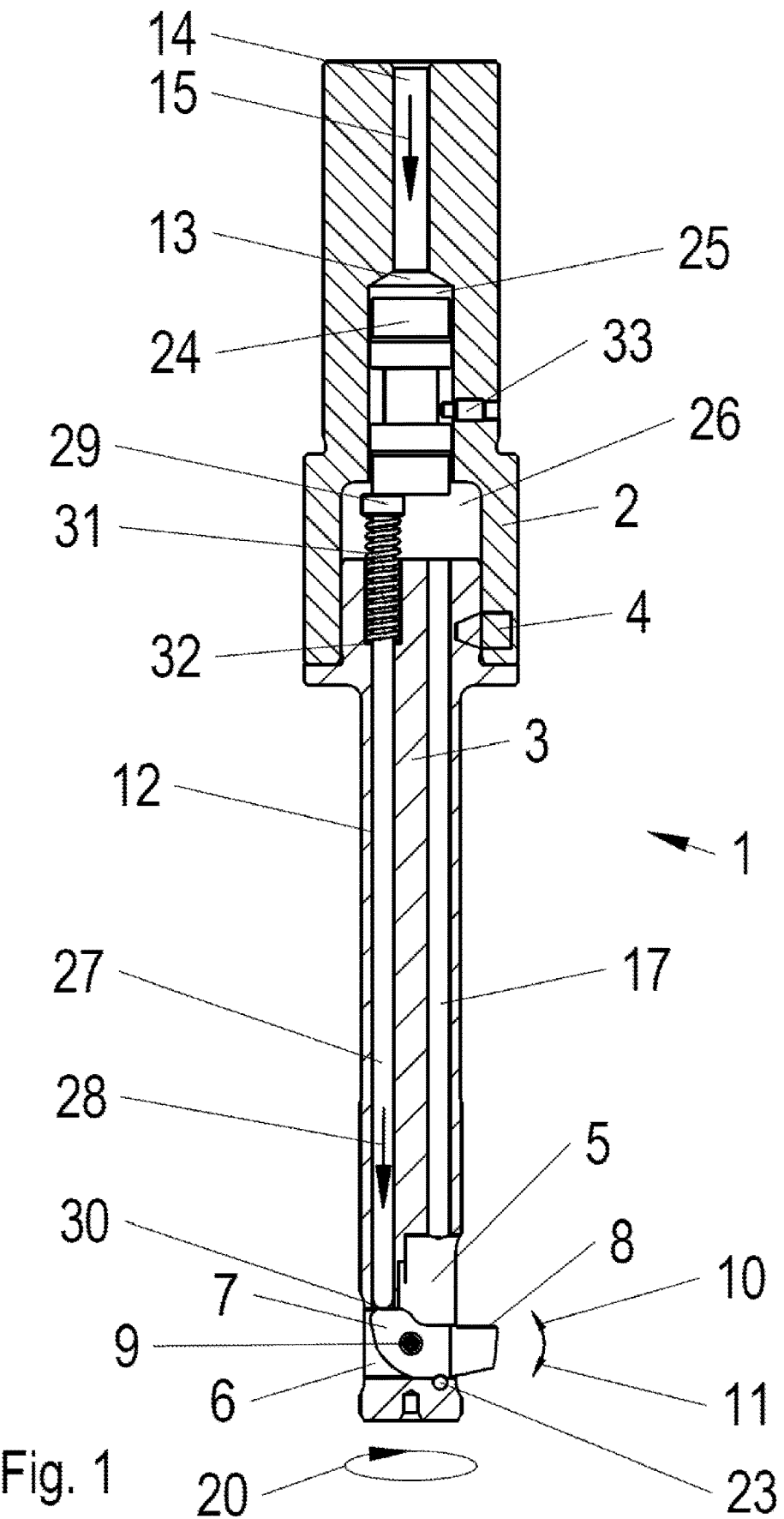

| | | |
|---|---|---|
| 8,672,591 B2 | 3/2014 | Heule et al. |
| 9,120,163 B2 | 9/2015 | Studer |
| 11,110,525 B2 * | 9/2021 | Albrecht ............... B23B 51/101 |
| 2017/0173707 A1 | 6/2017 | Studer et al. |

FOREIGN PATENT DOCUMENTS

| | | | |
|---|---|---|---|
| CN | 109070296 A | 12/2018 | |
| CN | 210877732 U | 6/2020 | |
| DE | 2625861 A1 * | 12/1976 | |
| DE | 102008004516 A1 * | 8/2009 | ......... B23B 51/0045 |
| DE | 102009012996 A1 | 9/2010 | |
| DE | 102008044802 B4 | 10/2014 | |
| DE | 102017209442 A1 | 12/2018 | |
| EP | 2161090 A2 | 3/2010 | |
| EP | 2589451 B1 | 9/2016 | |
| FR | 2671995 A1 * | 7/1992 | ........... B23B 51/102 |
| JP | S48-39257 Y1 | 11/1973 | |
| JP | S58-126105 U | 8/1983 | |
| JP | 2010-105148 A | 5/2010 | |
| JP | 2013-094960 A | 5/2013 | |
| KR | 20140107006 A * | 9/2014 | |

OTHER PUBLICATIONS

Chinese Serial No. 2021114303086, First Office Action dated Dec. 23, 2023.

Japanese Application No. 2021-204774, Office Action, Apr. 18, 2023.

* cited by examiner

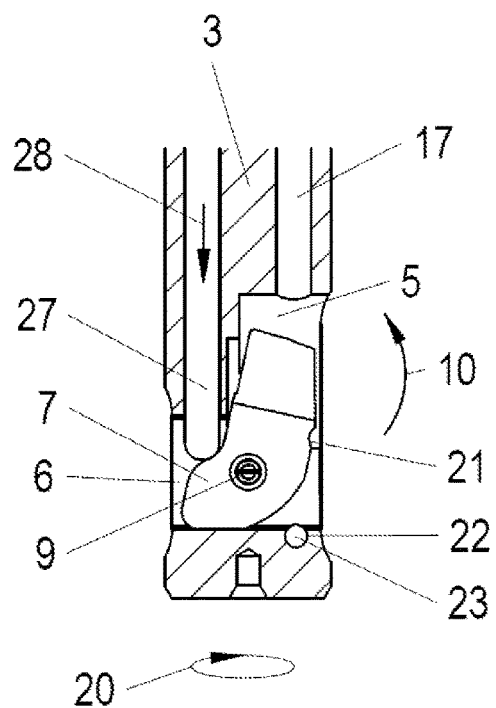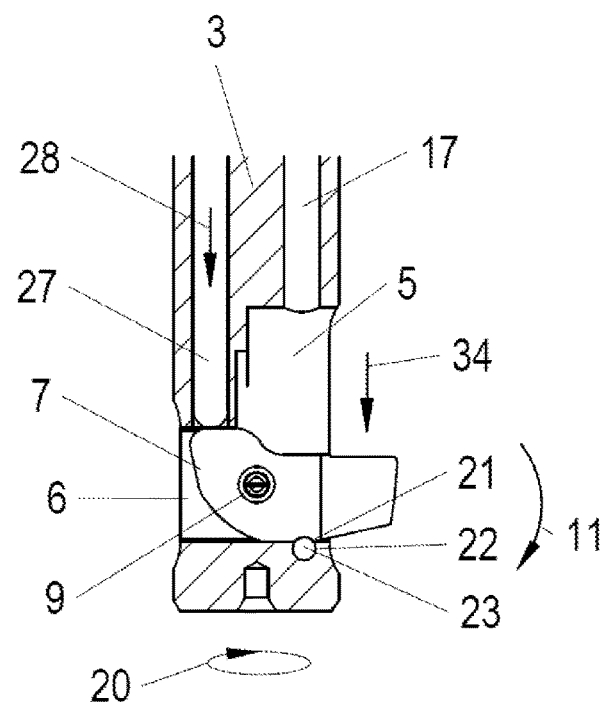
Fig. 5
Retracted
Fig. 6
Extended and radially crossed

PRESSURE-MEDIUM-CONTROLLED COUNTERSINKING TOOL WITH BLADE CENTERING

This application claims the priority benefit of EP Application Serial No. 20215337.5 filed Dec. 18, 2020, which is hereby incorporated by reference herein as if fully set forth in its entirety.

The subject matter of the invention is a pressure-medium-controlled countersinking tool according to the preamble of claim 1.

Such a countersinking tool is known, for example, from DE 10 2009 012 996 A1, which originates from the same applicant. In accordance with the description therein according to paragraphs 0001 up to and including 0005, the present invention relates to a countersinking tool defined therein, which is designed both as a back countersinking tool and as a front countersinking tool.

The invention also relates to a countersinking tool with one or two retractable blades, it being possible to operate each blade by means of its own piston-cylinder unit or to operate both blades together by means of a single piston-cylinder unit.

When arranging two blades, it is also preferred if one blade can be extended at the front of a blade window arranged in the blade housing, while the other blade can be extended from the back of the blade window with a complementary sequence of movements.

For the sake of simplicity, however, the following description assumes that there is only one blade to which a piston-cylinder unit actuated with a pressure medium is assigned, although the invention is not limited to the arrangement of a single blade. With regard to the mode of operation of such a pressure-medium-controlled countersinking tool, reference is generally made to the subject matter of DE 10 2009 012 996 A1.

EP 2 589 451 B1, which originates from the same applicant, describes a further pressure-medium-controlled countersinking tool with a piston-cylinder unit, reference being made to the disclosure of EP 2 589 451 B1 with regard to the structure and mode of operation.

However, the present invention is not limited to a blade of a countersinking tool that can be extended under centrifugal force. The invention therefore also provides pressure-medium-controlled countersinking tools in which either the extending process or the retracting process or both processes can be carried out with any drive force. The above-mentioned pressure-medium-controlled countersinking tools, which originated from the same applicant, can be optimized with regard to the countersinking accuracy and the reproducibility of the countersink made in a bore of a workpiece.

During operation of countersinking tools according to the subject matter of DE 10 2009 012 996 A1 or EP 2 589 451 B1, it has been found that there must be necessary clearance in the bearing bore for the pivot bearing of the at least one blade to enable extension of the (at least one) blade from the blade window without interference, without risking fracture of the blade bearing. This resulted in a maximum countersinking accuracy and a countersinking reproducibility of +/−0.2 mm.

The invention is therefore based on the object of developing a pressure-medium-controlled countersinking tool of the type mentioned at the beginning in such a way that the countersinking accuracy and the countersinking reproducibility are significantly improved.

To achieve the presented object, the invention is characterized by the technical teaching of claim 1.

The technical teaching according to the invention achieves the advantage for the first time that a countersinking accuracy of a minimum of +/−0.1 mm can be achieved. This is a significant step forward because, up to now, such countersinking accuracies could not be achieved with pressure-medium-controlled countersinking tools. By attaching an exclusively radially-acting blade centering protrusion in the blade housing, the blade is centered positively and free of play during the machining process. The necessary axial play in the blade bearing can, however, be maintained at the same time.

This centering enables a very high reproducibility of the countersink with little spread. Due to the corresponding manufacturing accuracy, this centering also enables absolute countersinking accuracy, which meets the expanded requirements on the market.

The machining process creates an axial machining force on the blade, which in a first preferred embodiment presses the blade with its centering groove against a housing-side centering bolt in the blade housing and centers and fixes it in its centering axis with a positive fit. The circularly profiled contact surfaces of the transversely extending centering groove arranged in the blade are positioned positively against complementary, likewise circularly extending contact surfaces of a housing-side centering bolt and center the blade on the housing-side centering bolt in the blade's centering axis extending in the longitudinal direction of the blade.

The centering device according to the invention thus secures the blade against radial displacement along the centering axis.

In other words, this means that the centering device according to the invention secures the blade against displacement play of the bearing bolt in the bearing bore on the base body side.

The centering device is preferably designed in such a way that, in the extended work state of the blade, the centering device carries out positive centering of the blade in the centering axis, such centering not being necessary in the retracted state.

The centering device is preferably arranged a distance away from the bearing bolt with play in the bearing bore.

In addition to the first preferred embodiment described above, there are several other embodiments for the design of the centering device, in which all embodiments have in common that there is a positive engagement of projections or recesses arranged on the blade in associated blade-housing-side recesses or projections, at least in the extended state of the at least one blade.

In the first preferred embodiment of the invention, it is provided that the centering device consists of a centering groove arranged at the base of the blade, the longitudinal extension of which is perpendicular to the centering axis of the blade and which, in the machining position, comes into positive engagement with a housing-side centering bolt.

The centering groove at the base is accordingly designed as a transverse groove in the base area of the blade and interacts with a part of a centering bolt on the housing side with positive engagement.

The invention is not restricted to this. In another embodiment of the invention, the kinematic reversal of the first embodiment can be provided, in which the centering bolt is arranged at the base side of the blade and can be brought into engagement with a transversely extending centering groove on the housing side.

In all related designs, it is particularly advantageous if the centering bolt has a round profile and protrudes from its mounting bore (on the blade or on the housing) with the upper part of its outer circumference and forms a complementary centering surface there for engaging the centering groove (on the blade or on the housing).

For the sake of simplicity, the following description is based on the first kinematic design, in which the centering bolt is arranged on the housing side and fitted into a housing-side receiving bore, and the complementary centering groove is designed as a transversely extending centering groove at the base side of the blade. This simplified description is given for the sake of simplicity, without the invention being restricted to this one kinematic embodiment.

Attaching a centering bolt to the housing side is easier, in any case, from a manufacturing point of view than attaching such a centering bolt to the base side of a blade.

When the centering bolt is attached to the housing, it is preferred if it is designed to be replaceable. It can thus be removed from its transverse bore in the direction of its longitudinal extension. Thus, the centering bolt can have different material properties compared to the material of the blade and also can be replaced if there are signs of wear.

The centering bolt can also be designed as a spring element which snaps into the centering groove designed as a transverse groove at the base side of the blade in the extended state. This can be a latching over-dead-center connection.

In a further embodiment of the invention, it is provided that the centering device consists either of a centering protrusion arranged at the top or base of the blade, which centering protrusion, in the machining position, comes into positive engagement with a housing-side, complementary centering bolt.

During operation, it has been found that, with the axial machining force generated by the machining process, the blade with its centering groove or its centering protrusion presses against the centering bolt or against the centering groove in the blade housing and the blade is positively centered and fixed in the centering axis in the blade housing. It was found that the main machining forces are transferred to the blade housing via contact points in the blade window and not via the pivot bearing, which consists of a bearing bolt and a mounting bore. This was the reason why originally sufficient play had to be provided in the blade bearing with the countersinking tools belonging to the prior art. According to the invention, however, it is now provided that the only remaining, radially acting degree of freedom influencing the countersinking result is eliminated with the new centering mechanism.

The removal of chips, which played a major role in the subject matter of DE 10 2009 012 996 A1, only plays a subordinate role in the current system because a sufficient flushing function with the cooling lubricants present is provided in the machining process. In this way it is ensured that the centering devices according to the invention are kept free of chips. The positive-fitting and thus sealing engagement of the blade-side centering parts in the associated housing-side, complementary centering parts also plays a role because the positive-fitting engagement protects the centering device from the penetration of chips.

The centering device seals itself, so to speak, during the machining process, because a positive-fitting engagement prevents the penetration of chips into the centering mechanism. If there is a deposit of chips in the centering device, these are cleared out when the blade is retracted into the centering device.

If only the deburring of a bore in the back countersinking mode is described in one of the subclaims, this is not to be understood as restrictive. The invention relates to all modes of operation of a countersinking tool, regardless of whether the deburring takes place in front or back countersinking mode.

In a further preferred embodiment, it can be provided that additional, further centering devices for centering the blade in the centering axis are arranged at the side surfaces of the blade window.

It is thus provided that not only the top- or base-side centering devices according to the invention are provided between the at least one blade and the associated surfaces in the blade housing, but also further centering devices arranged perpendicular thereto, which are arranged in the side surfaces of the blade window.

The subject matter of the present invention results not only from the subject matter of the individual claims, but also from the combination of the individual claims with one another.

All information and features disclosed in the documents, including the abstract, in particular the spatial configuration shown in the drawings, could be claimed as being essential to the invention, provided that they are novel, individually or in combination, as compared to the prior art. The use of the terms "essential" or "according to the invention" or "essential to the invention" is subjective and does not imply that the features named in this way must necessarily be part of one or more claims.

In the following, the invention will be explained in greater detail by means of drawings representing only one execution path. Further features and advantages of the invention that are essential to the invention emerge from the drawings and the description thereof.

Figure 2:
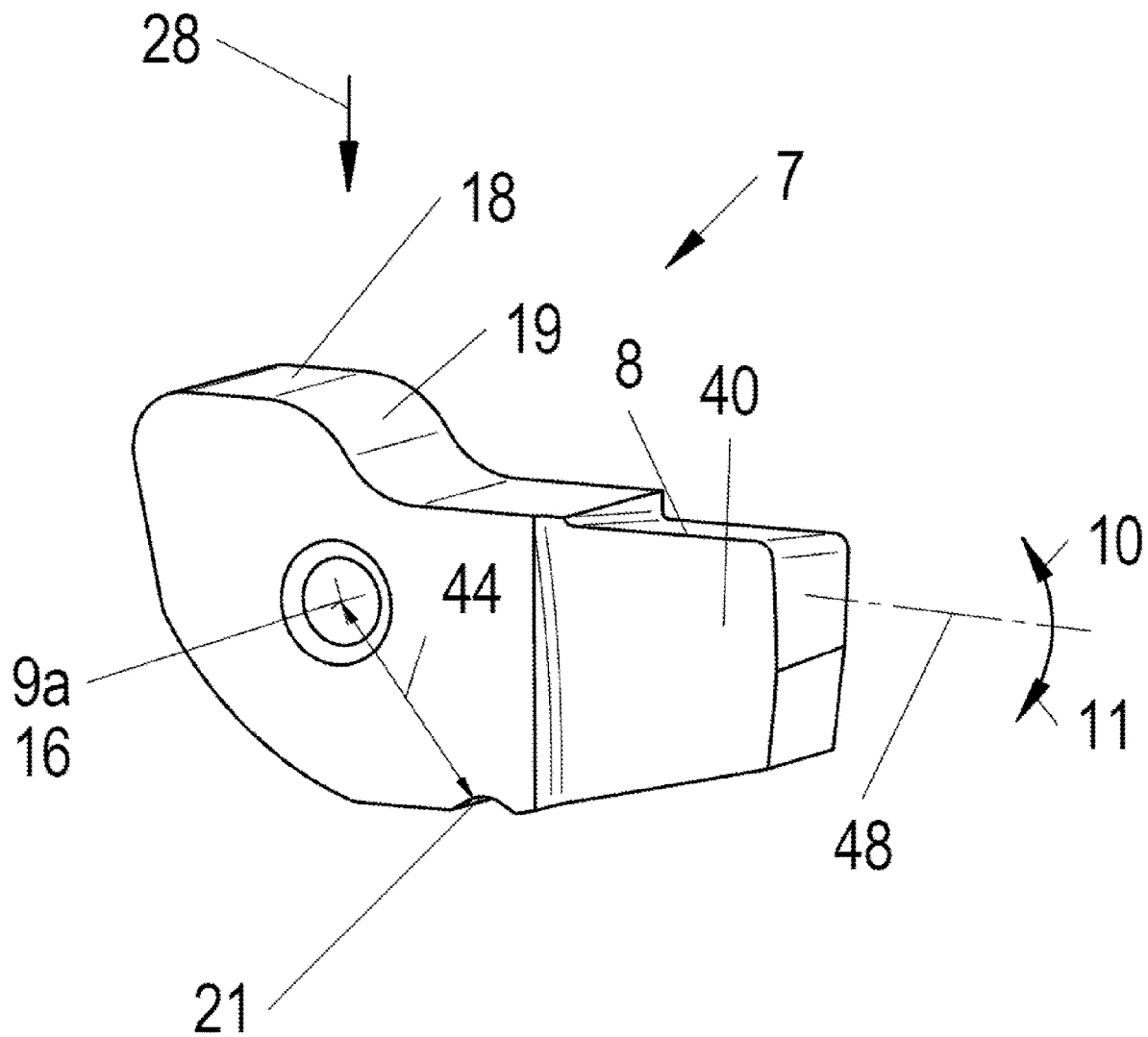
Figure 3:
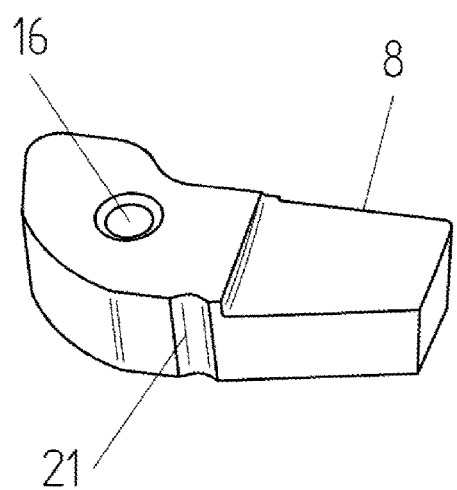
Figure 4:
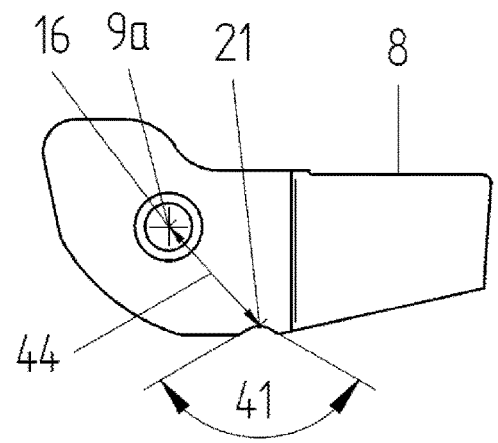
Figure 7:
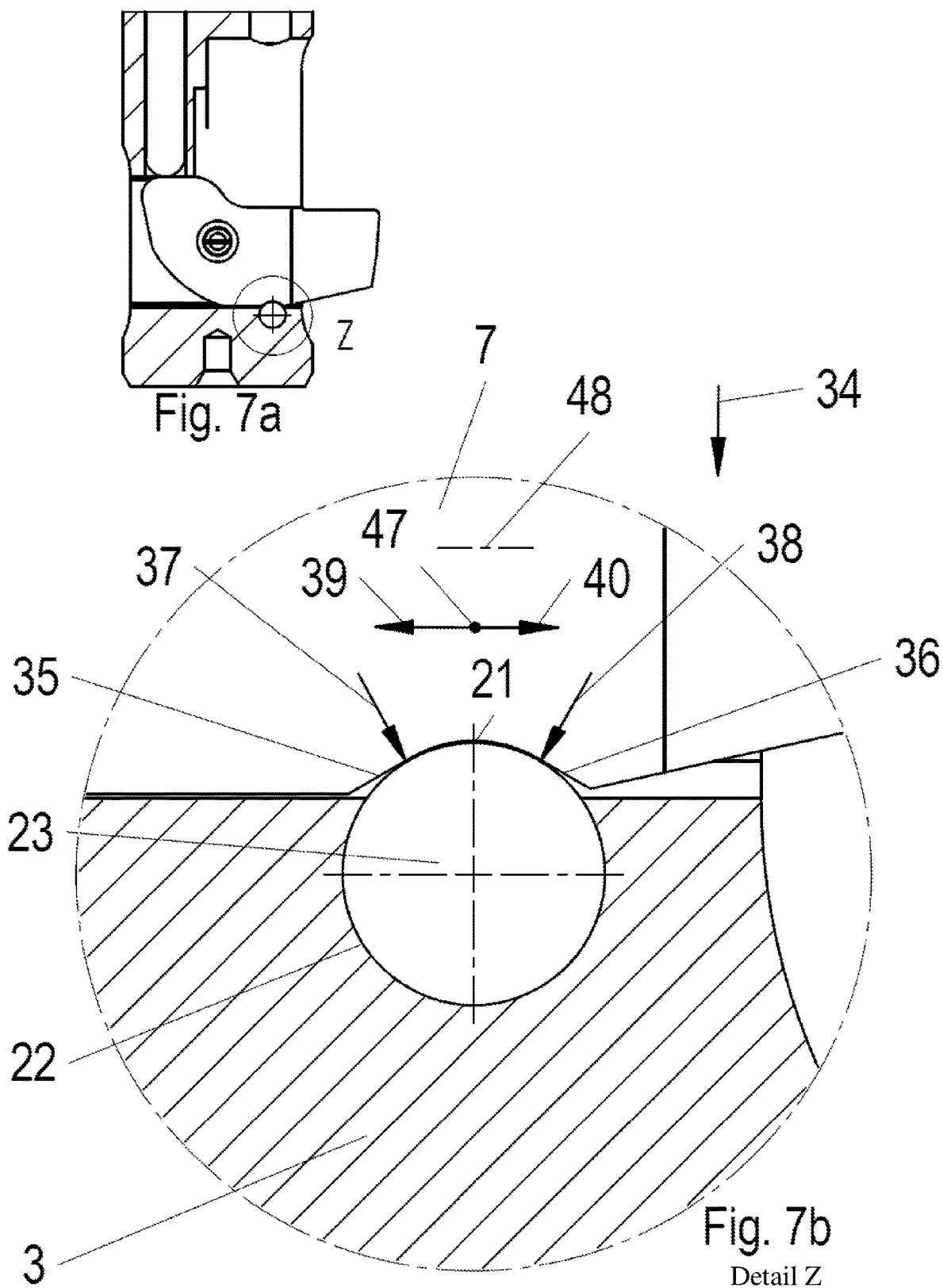
Figure 8:
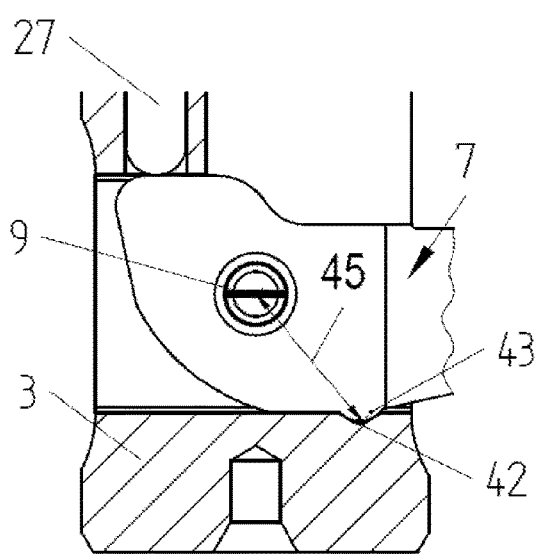

The following is shown:

FIG. 1: section through a pressure-medium-controlled countersinking tool with radial centering of the blade FIG. 2: perspective view of the blade FIG. 3: a preferred embodiment of a blade in a perspective view FIG. 4: the side view of the blade according to FIG. 3 showing further details FIG. 5: the countersinking tool according to FIG. 1 with the blade retracted FIG. 6: the countersinking tool according to FIG. 1 with an extended blade, which is in the countersinking position FIG. 7a: the same representation as FIG. 6 with the specification of a drawing detail Z FIG. 7b: the drawing detail Z from FIG. 7a FIG. 8: a first embodiment modified compared to FIG. 6

Figure 9:
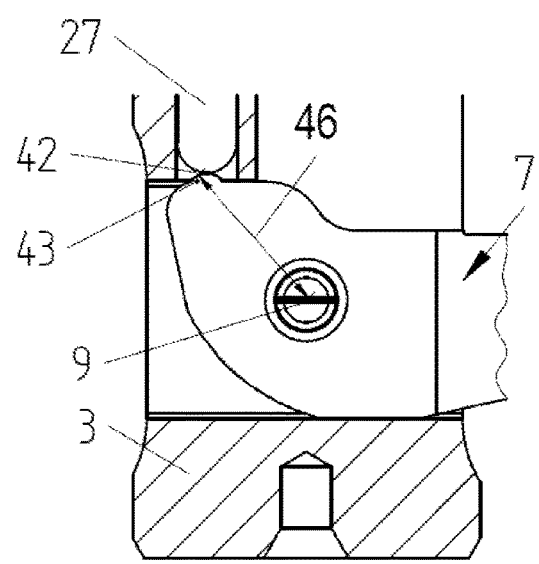

FIG. 9: a second embodiment modified compared to FIG. 6

In FIG. 1, the preferred embodiment of a countersinking tool 1 is shown, which consists essentially of a cylindrical base body 2, which is driven to rotate about its longitudinal axis in arrow direction 20 and in the direction opposite thereto, a supply bore 14 being arranged in the upper region of the base body 2, by means of which a pressure medium 13 is pressed into a cylinder space 25 of the base body 2 in arrow direction 15.

In the cylinder space 25, a piston 24 is mounted displaceably in the direction of the longitudinal extension of the base body and, when it is displaced, drives a bolt head 29 via a suitable piston rod to which a pressure element is attached, which bolt head is part of a control bolt 27 which is driven displaceably in a longitudinal bore 12 of the base body and the bolt end 30 of which acts on the free, pivotable end of a blade 7 pivotably mounted on a bearing bolt 9. The actuation of the control bolt 27 in arrow direction 28 takes place against the force of a compression spring 31, the lower end of which rests against a stop 32 on the housing side. In this way, the spring-loaded return of the control bolt 27 is ensured when no pressure medium 13 is applied to the piston 24. Instead of a spring return, other return drives can also be used.

To limit the stroke of the piston 24, a stop screw 33 is screwed into the base body 2, which stop screw protrudes with its bolt-side end into the displacement path of the piston 24.

A cylinder chamber 26 is also arranged in the base body 2, through which cylinder chamber the pressure medium 13 flows in the manner of a flushing agent flow, which is directed downward into the blade chamber 5 via a bypass bore 17 extending in the extended part of the blade housing 3. This ensures that the blade chamber 5 is sufficiently flushed with the pressure medium 13 and the entire blade chamber 5 is kept free of chips.

The blade housing 3 is preferably detachably arranged on the base housing 2 and at least one fastening screw 4 is used to connect the two parts.

FIG. 1 shows the blade 7 extended from the blade window 6 in the blade's machining position, the entire countersinking tool 1 being driven to rotate in direction of rotation 20.

The blade 7 is pivotably mounted with a bearing bolt 9 in an associated bearing bore 16 (see FIG. 2), the two parts 9, 16 forming a horizontal pivot axis 9a.

In the machining process, the lateral cutting edge 8 on the blade 7 comes into engagement with a bore edge, not shown in detail, of a bore, the edge of which is deburred and/or countersunk.

In the prior art, the blade 7 extended in the countersink position still had an undesirable degree of freedom in the bearing bore 16, which is now eliminated by the centering devices according to the invention.

The undesired degree of freedom is shown in FIG. 7b as a radial displacement 47 in arrow directions 39, 40 along the centering axis 48. According to the invention, the centering device in the preferred first embodiment consists of a centering groove 21 introduced at the base of the underside of the blade 7, which groove is designed as a transverse groove and the longitudinal extension of which is parallel to the longitudinal extension of the bearing bolt and the bearing bore 16.

In order to eliminate the movement play in arrow directions 39, 40 and to ensure centering along the centering axis 48, it is provided that, in the machining position shown, an at least half-open mounting bore 22 (see FIG. 7b) receives a preferably circularly profiled centering bolt 23, which only protrudes with its upper outer circumference from the mounting bore 22 in order to ensure centering at the complementary contact surfaces 35, 36 of the centering groove 21 with its circumferential centering surfaces.

From FIG. 2 also shows that the bolt end 30 of the control bolt 27 acts on spaced apart control surfaces 18, 19 in order to move the blade from the extended machining position into its retracted position in arrow direction 10.

Further details can be seen from FIG. 7a in conjunction with FIG. 7b.

The machining process creates an axial machining force 34 which presses the blade 7 with the centering groove 21 against the centering bolt 23 in the blade housing 3 and centers and fixes it in a positive-fitting manner both in arrow direction 39 and in arrow direction 40, whereby a radial displacement 47 acting in these directions 39, 40 is eliminated and a centering axis 48 is defined, which prevents displacement of the blade 7 in arrow directions 39, 40 in the blade housing 3.

FIGS. 3 and 4 show the blade 7 with its lateral cutting edge 8, where it can be seen that the preferred centering groove 21 is arranged as a transverse groove on the base side of the blade at a distance 44 from the bearing bore 16. The centering groove 21 has a centering angle 41, which is complementary to the outer circumference of the centering bolt 23, which is essentially free of play, but preferably replaceable, and is mounted in a mounting bore 22 in the blade housing 3. Only the upper outer circumference of the centering bolt 23 protrudes from the mounting bore 22 in order to produce contact surfaces that are complementary to the outer circumference of the centering bolt 23 at the contact points 37, 38 on the blade side.

In comparison to FIG. 6, FIG. 5 shows that, in the retracted state of the blade according to FIG. 5, the centering device is not engaged, i.e. the entire retractable part of the blade 7 is accommodated in the blade chamber 5.

Only when the blade 7 according to FIG. 6 comes into its extended and radially centered machining position in arrow direction 11 does a positive engagement of the contact points 37, 38 of the blade 7 occur in the upper outer circumference of the centering bolt 23 according to FIG. 7b.

The relationships just described are shown in the drawing in FIG. 7b, a centering axis 48 also being indicated by dotted-dashed lines, which eliminates the radial tilting displacement 47 indicated by arrows 39, 40 and holds the blade centrically and positively on the upper outer circumference of the centering bolt 23.

The centering bolt 23 can be fitted into an associated fit of the mounting bore 22 without play. This means that the centering bolt has no play in the mounting bore 22 and is stuck there.

In another embodiment, not shown in the drawing, the centering bolt 23 can, however, also be accommodated in the mounting bore 22 in a replaceable manner. It can then be removed from the mounting bore 22 for replacement with a suitable tool.

The material of the centering bolt 23 is otherwise independent of the material of the blade housing 3, which means that the centering bolt 23 can also consist of a hardened metal material. It can also consist of a metal which is softer than the material of the blade. It can also consist of a plastic material.

In another embodiment, not shown in detail in the drawing, it can also be provided that the centering bolt 23 is designed as a spring bolt, so that its outer circumference is spring-loaded radially outwardly. When the centering groove 21 arranged at the base side of the blade 7 is placed on the centering bolt 23, which is designed as a spring bolt, there is a positive snap connection between the blade-side groove and the housing-side spring bolt. When the blade is pivoted in arrow direction 10 into its retracted position according to FIG. 5, this snap connection is released again.

FIGS. 8 and 9 show two further embodiments of a centering device, where it can be seen from FIG. 8 that the centering device, at a distance 45 away from the pivot axis 9a of the bearing bolt 9, consists of an element 43 molded onto the base side of the blade 7, which element does not necessarily have to extend over the entire breadth of the blade. It can also be punctiform or consist of a plurality of centering protrusions 43 arranged at a distance from one another. The one or more centering protrusions 43 protruding from the base side of the blade 7 then positively engage in associated, complementary centering grooves 42 or centering protrusions or which are countersunk in the base surface of the blade window 6. There are also various options for this.

One or more half-open centering grooves at the base side of the blade window 6 can be arranged next to one another and aligned in the same transverse line.

In another embodiment, it can be provided that the one centering groove 42, which is recessed in the base side of the blade window, extends over the entire width of the blade window.

The same illustration also applies to a kinematic modification of the centering recess shown in FIG. 89. Using the same information given above it can be seen that the centering assembly 42, 43 is not arranged at the base side of the blade 7, but on the opposite side, namely at a distance 46 from the pivot axis 9a of the bearing bolt 9. In order to form the parts of the centering device shown there, the same information applies as was given with reference to the centering device 42, 43 in FIG. 8.

Overall, a precisely defined centering axis 48 was obtained and a radial displacement 47 in directions of arrows 39, 40 was effectively eliminated with the arrangement of the centering devices 21, 23; 42, 43.

It is important that the centering device protects the blade from displacement along the centering axis 48 and not from tilting. A tilt does not have to be accommodated or eliminated by the centering device because the blade rests against the left and right surfaces of the blade window in this direction and its degree of freedom is thus sufficiently restricted.

This enabled the countersinking accuracy to be improved by a factor of 10 compared to conventional countersinking tools according to the prior art.

FIGURE LEGEND

1 Countersinking tool
2 Base body
3 Blade housing
4 Fastening screw
5 Blade chamber
6 Blade window
7 Blade
8 Cutting edge
9 Bearing bolt
9a Pivot axis
10 Arrow direction
11 Arrow direction
12 Longitudinal bore
13 Pressure medium
14 Supply bore
15 Arrow direction
16 Bearing bore (of 7)
17 Bypass bore
18 Control surface
19 Control surface
20 Direction of rotation
21 Centering groove (of 7)
22 Mounting bore (of 3)
23 Centering bolt
24 Piston
25 Cylinder space
26 Cylinder space
27 Control bolt
28 Arrow direction (of 27)
29 Bolt head (of 27)
30 Bolt end (of 27)
31 Compression spring
32 Stop
33 Stop screw
34 Axial machining force
35 Contact surface 1 (of 21)
36 Contact surface 2 (of 21)
37 Contact point 1
38 Contact point 2
39 Arrow direction
40 Arrow direction
41 Centering angle
42 Centering groove (of 3)
43 centering protrusion (of 7)
44 Distance (between 9a and 21)
45 Distance (between 9a and 42, 43)
46 Distance (between 9a and 42, 43)
47 Radial tilt displacement
48 Centering axis

The invention claimed is:

1. A pressure-medium-controlled countersinking tool with one or more machining blades which are arranged in a rotatably driven main body and which can be actuated in their pivot position by supplying a pressure medium, wherein the actuation of the at least one blade takes place via at least one piston-cylinder unit actuated by the pressure medium, wherein the at least one blade is pivotably mounted on a bearing bolt forming a pivot axis and can be extended from a blade window, wherein a centering device is arranged between the blade and the blade window of a blade housing at a radial distance from the pivot axis and within the pivot range of the at least one blade, the centering device comprises a centering groove arranged on the foot side on the underside of the blade, which in the cutting position is in positive engagement with a centering bolt on the housing side, and the centering bolt has a round profile and protrudes from a mounting bore with the upper part of its outer circumference and forms a complementary centering surface there for engaging the centering groove.

2. The pressure-medium-controlled countersinking tool according to claim 1, wherein the centering device secures the blade against a radial displacement along a centering axis.

3. The pressure-medium-controlled countersinking tool according to claim 1, wherein the centering device secures the blade against displacement play of the bearing bolt in a base-body-side bearing bore.

4. The pressure-medium-controlled countersinking tool according to claim 1, wherein the centering device comprises a centering protrusion arranged at the top or base of the blade, which centering protrusion, in the machining position, comes into engagement with a housing-side centering groove.

5. The pressure-medium-controlled countersinking tool according to claim 1, wherein, with the axial machining force generated by the machining process, the blade with a centering groove or a centering protrusion presses against the centering bolt or against the centering groove in the blade housing and the blade is positively centered and fixed in the centering axis in the blade housing.

6. The pressure-medium-controlled countersinking tool according to claim 1, wherein the blade, in the retracted state, passes through a bore to be countersunk on the rear side in a workpiece and in the extended state from the blade window creates a back countersink in the back bore of a workpiece.

7. The pressure-medium-controlled countersinking tool according to claim 1, wherein the blade is centered in the axial direction along the central axis of the bearing bolt or a bearing bore in the blade window.

8. The pressure-medium-controlled countersinking tool according to claim 1, wherein the main machining forces of the blade can be transferred into the blade housing via contact points of the blade on the blade window.

9. The pressure-medium-controlled countersinking tool according to claim 1, wherein the only remaining, radially acting degree of freedom influencing the countersinking result is eliminated with a centering mechanism.

10. The pressure-medium-controlled countersinking tool according to claim 1, wherein a centering bolt can be replaced when it becomes worn.

11. A pressure-medium-controlled countersinking tool with one or more machining blades which are arranged in a rotatably driven main body and which can be actuated in their pivot position by supplying a pressure medium, wherein the actuation of the at least one blade takes place via at least one piston-cylinder unit actuated by the pressure medium, wherein the at least one blade is pivotably mounted on a bearing bolt forming a pivot axis and can be extended from a blade window, wherein a centering device is arranged between the blade and the blade window of a blade housing at a radial distance from the pivot axis and within the pivot range of the at least one blade, wherein the centering device comprises a centering groove arranged on the base of the blade, the longitudinal extension of which is perpendicular to a centering axis of the blade and which, in the machining position, comes into positive engagement with a housing-side centering bolt.

12. The pressure-medium-controlled countersinking tool according to claim 11, wherein the housing-side centering bolt has a circular profile, is fitted into a housing-side mounting bore, and protrudes with the upper part of its outer circumference from the mounting bore and at said location forms a centering surface for engagement with the centering groove of the blade.

13. The pressure-medium-controlled countersinking tool according to claim 12, wherein the housing-side centering bolt is accommodated replaceably in the housing-side mounting bore.

14. A pressure-medium-controlled countersinking tool with one or more machining blades which are arranged in a rotatably driven main body and which can be actuated in their pivot position by supplying a pressure medium, wherein the actuation of the at least one blade takes place via at least one piston-cylinder unit actuated by the pressure medium, wherein the at least one blade is pivotably mounted on a bearing bolt forming a pivot axis and can be extended from a blade window, wherein a centering device is arranged between the blade and the blade window of a blade housing at a radial distance from the pivot axis and within the pivot range of the at least one blade, wherein, during the blade centering, two blade-side contact surfaces of a centering groove rest against a complementary cylindrical surface of a housing-side centering bolt and, in doing so, center the blade in a centering axis in the blade housing with a positive fit and free of play.

15. A pressure-medium-controlled countersinking tool comprising a base body driven to rotate about a longitudinal axis of the tool, a blade housing extending longitudinally from the base body, and at least one machining blade pivotably mounted on a bearing bolt in the blade housing to form a pivot axis, the at least one blade pivotable about the pivot axis to extend from a blade window in the blade housing, wherein the at least one blade is pivotally actuated by supplying a pressure medium, wherein the actuation of the at least one blade takes place via at least one piston-cylinder unit actuated by the pressure medium, the tool having a centering device comprising a centering bolt in the blade housing and a transverse centering groove on the blade which are brought into engagement by pivotal actuation of the at least one blade, wherein the bearing bolt is located between the centering bolt and the base body along the longitudinal axis of the tool.

16. The pressure-medium-controlled countersinking tool of claim 15, wherein the centering groove is designed as a transverse groove and its longitudinal extent is parallel to the longitudinal extent of the bearing bolt and the bearing bore.

17. The pressure-medium-controlled countersinking tool of claim 15, wherein a mounting hole is formed as an at least half-open mounting hole, which is provided at the bottom of the blade window.

\* \* \* \* \*